United States Patent [19]

Pessina et al.

[11] Patent Number: 5,253,747
[45] Date of Patent: Oct. 19, 1993

[54] EQUIPMENT ADAPTED TO PERFORM A COORDINATED TRANSFER OF PACKAGED SIGNATURE BUNDLES FORM PACKAGING ASSEMBLIES TO DOWNSTREAM MACHINES

[75] Inventors: Giorgio Pessina; Aldo Perobelli, both of Cusano Milanino, Italy

[73] Assignee: O.M.G. di Giorgio Pessina e Aldo Perobelli S.n.c., Milan, Italy

[21] Appl. No.: 966,111

[22] Filed: Oct. 22, 1992

Related U.S. Application Data

[63] Continuation of Ser. No. 649,300, Jan. 30, 1991, abandoned, which is a continuation of Ser. No. 359,525, Jun. 1, 1989, abandoned.

[30] Foreign Application Priority Data

Jun. 27, 1988 [IT] Italy ............................... 21116 A/88

[51] Int. Cl.⁵ ............................................. B65G 37/00
[52] U.S. Cl. .................................................. 198/631
[58] Field of Search ................ 198/631, 464.4, 810, 198/502.1; 414/751

[56] References Cited

U.S. PATENT DOCUMENTS

| | | | |
|---|---|---|---|
| 2,645,330 | 7/1953 | Stephenson | 198/856 X |
| 2,850,146 | 9/1958 | Madeira | 198/812 |
| 3,129,807 | 4/1964 | Richter et al. | 198/856 |
| 3,352,406 | 11/1967 | Long | 198/812 |
| 3,596,785 | 8/1971 | Weatherford, Jr. | 198/812 |
| 3,840,064 | 10/1974 | Von Woff | 198/631 X |
| 3,947,832 | 3/1976 | Rösgen et al. | 198/855 X |
| 4,104,847 | 8/1978 | Glandon et al. | 198/631 X |
| 4,478,329 | 10/1984 | Heiz | 198/631 X |
| 4,750,132 | 6/1988 | Pessina et al. | 414/751 X |

FOREIGN PATENT DOCUMENTS

| | | |
|---|---|---|
| 906044 | 6/1987 | Belgium . |
| 0217757 | 4/1987 | European Pat. Off. . |
| 2834975 | 2/1980 | Fed. Rep. of Germany . |
| 3208901 | 8/1983 | Fed. Rep. of Germany . |
| 2077680 | 12/1981 | United Kingdom ................ 198/810 |
| 2078186 | 1/1982 | United Kingdom ................ 198/810 |

Primary Examiner—D. Glenn Dayoan
Attorney, Agent, or Firm—Dann, Dorfman, Herrell and Skillman

[57] ABSTRACT

The subject matter relates to an equipment adapted to perform coordinated transfer of packaged signature bundles from packaging facilities to downstream machines.

The equipment substantially comprises endless conveyor belts mounted on stationary or movable supporting structures. Said conveyors are installed within a passage to be extended between said facilities and downstream machines, which passage may also be used as a service lane.

In particular, the movement of the conveyors and/or supporting structures thereof into the passage is automatically controlled, being interlocked with suitable sensors, adapted to sense the possible presence of operators within the operating range of said conveyors.

2 Claims, 3 Drawing Sheets

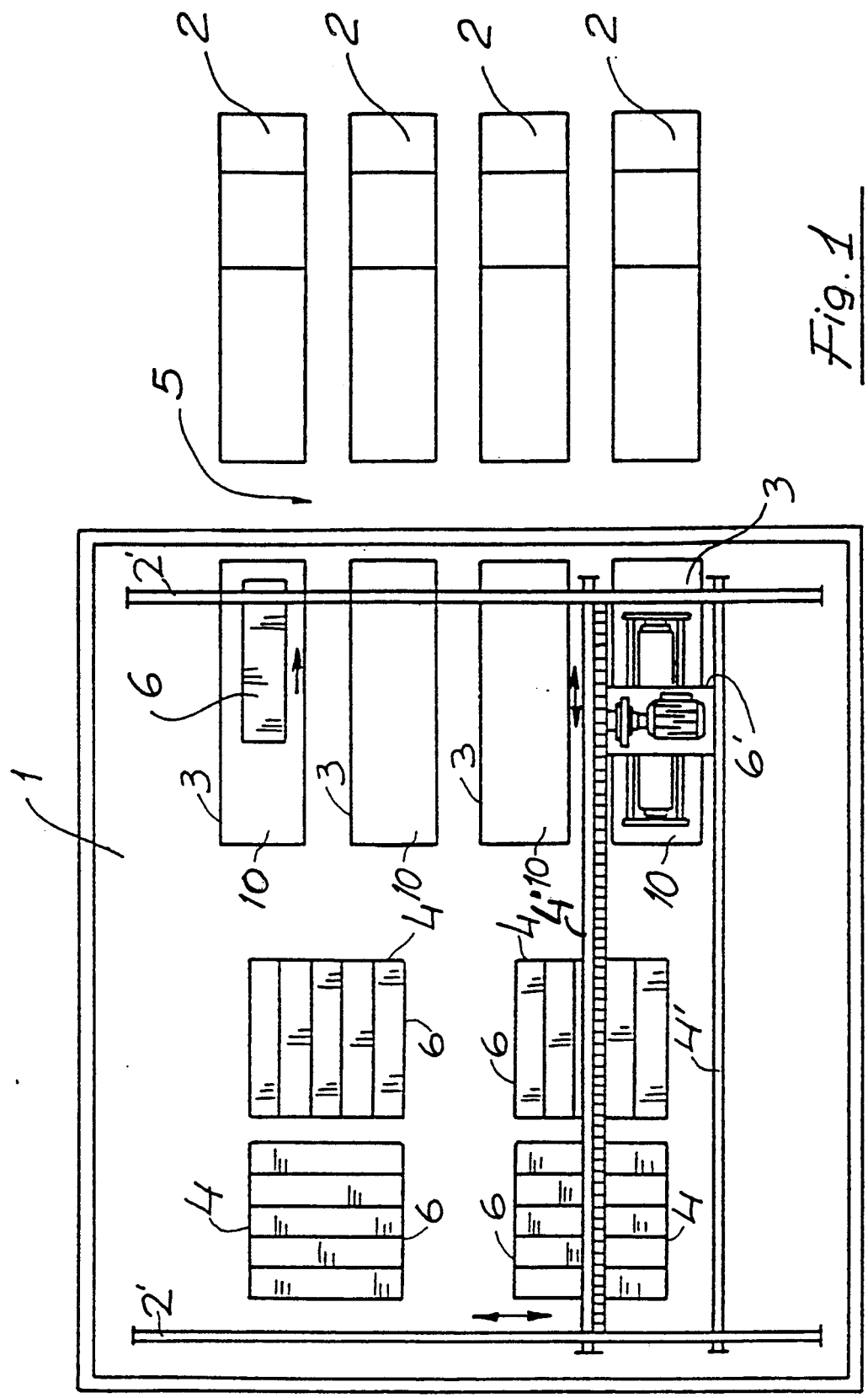

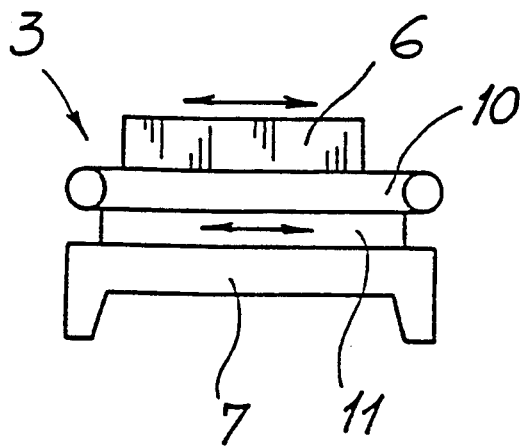
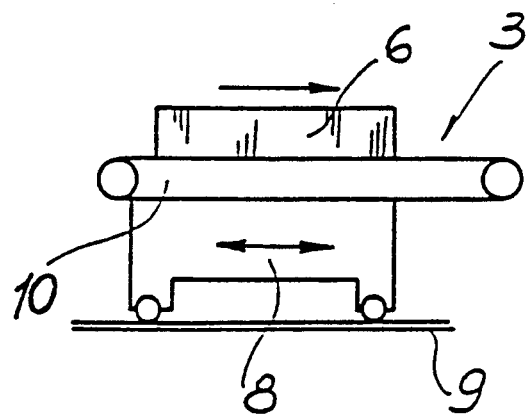
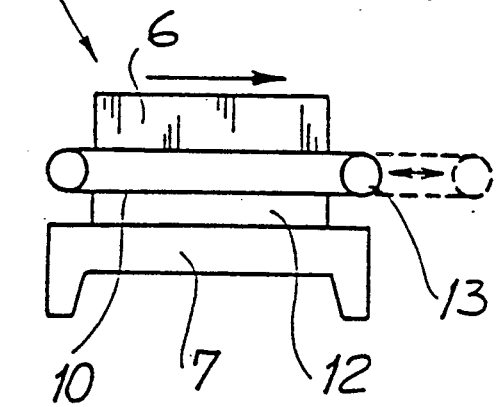
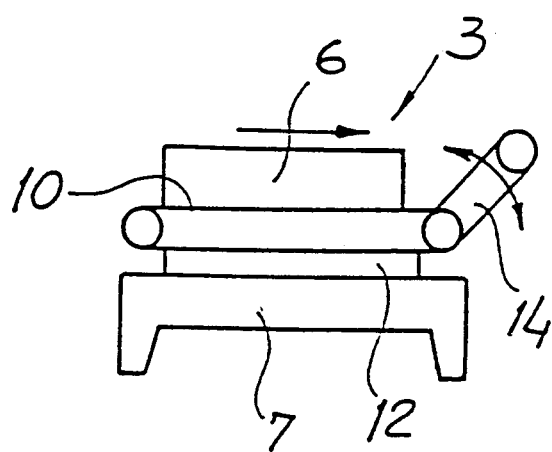

EQUIPMENT ADAPTED TO PERFORM A COORDINATED TRANSFER OF PACKAGED SIGNATURE BUNDLES FORM PACKAGING ASSEMBLIES TO DOWNSTREAM MACHINES

This is a continuation of copending application Ser. No. 07/649,300, filed Jan. 30, 1991, now abandoned, which is a continuation of application Ser. No. 07/359,525, filed Jun. 1, 1989, now abandoned.

The subject of this invention is an equipment adapted to perform a coordinated transfer of bundles of packaged signatures from packaging facilities to downstream machines.

BACKGROUND OF THE INVENTION

As it is already known, special integrated cycle equipment is presently available, adapted to perform transfer of individual generally pallet-supported bundles of signatures, and a station for further signature processing, in particular for packaging, or stacking thereof. For a better understanding of said equipment and operation thereof, reference should be made to our U.S. Pat. No. 4,750,132.

On the other hand, it is known as well that, downstream from said equipment an operating discontinuity takes place, due to an impossibility to directly feed downstream machines for further processing of the stacked signatures.

Said impossibility may substantially be attributed to the fact that, downstream from the platforms (of the above equipment) where the stacked signatures are piled up, a free space or lane has to be provided, which is accessible and available for allowing operators in charge of checking the apparatus and of possible actions for ensuring correct operation thereof, to freely move therearound.

SUMMARY OF THE INVENTION

It is an object of this invention to overcome the limitations previously complained about by providing an equipment adapted to perform a coordinated transfer of packaged signature bundles from packaging facilities to downstream machines, allowing said downstream machines to be fed at a substantially constant rate.

Within said object, this invention has a further purpose to provide an equipment, adapted to perform coordinated transfer of packaged signature bundles, from packaging facilities to downstream machines, which allows inspection personnel to be present, downstream from said packaging facilities, while maximum safety conditions are guaranteed. In fact the operators for maintenance and checking the equipment pass in the passage without the danger to be under the movements of the jaw assembly transferring the bundles and they can pass from one conveyor belt to another in safety conditions. In such manner, each operator can assist easily two transfer lines; on the contrary in the prior U.S. Pat. No. 4,750,132, each operator can check only one transfer line.

It is a further object of this invention to provide an equipment for coordinately transferring packaged signature bundle from packaging facilities to downstream machines, which is structurally simple and operates very reliably.

The objects and purposes set forth above, as well as others, which might become more apparent in the following, are met in an equipment according to this invention adapted to perform a coordinated transfer of packaged signature bundles from packaging facilities to downstream machines, characterized in that it substantially includes endless conveyor belts mounted on stationary or moving supporting structures, in such a way that possible relative traverse motion is allowed; said conveyors are interposed within a passage—provided in between said facilities and machines—adapted to perform, in addition, as a service passage; in particular, displacements of said conveyors and/or of the related supporting structures, are automatically controlled by suitable sensors, adapted to sense an operator being possibly present within the range of action of said conveyors.

BRIEF DESCRIPTION OF THE DRAWINGS

Further features and advantages of the equipment adapted to perform coordinated transfer of packaged signature bundles, the subject of this Invention, will be better understood by reference to the following drawings

FIG. 1 shows schematically an integrated cycle facility having further machines installed downstream therefrom;

FIG. 2 schematically shows an endless conveyor belt which may be extended by a longitudinally sliding support.

FIG. 3 schematically shows an endless conveyor which is supported on a truck movable along tracks;

FIG. 4 schematically shows an endless conveyor which has an extensible conveyor support;

FIG. 5 schematically shows an endless conveyor which has a portion of the conveyor movable similar to a drawbridge; and

DESCRIPTION OF THE PREFERRED EMBODIMENTS

Figure 1A:
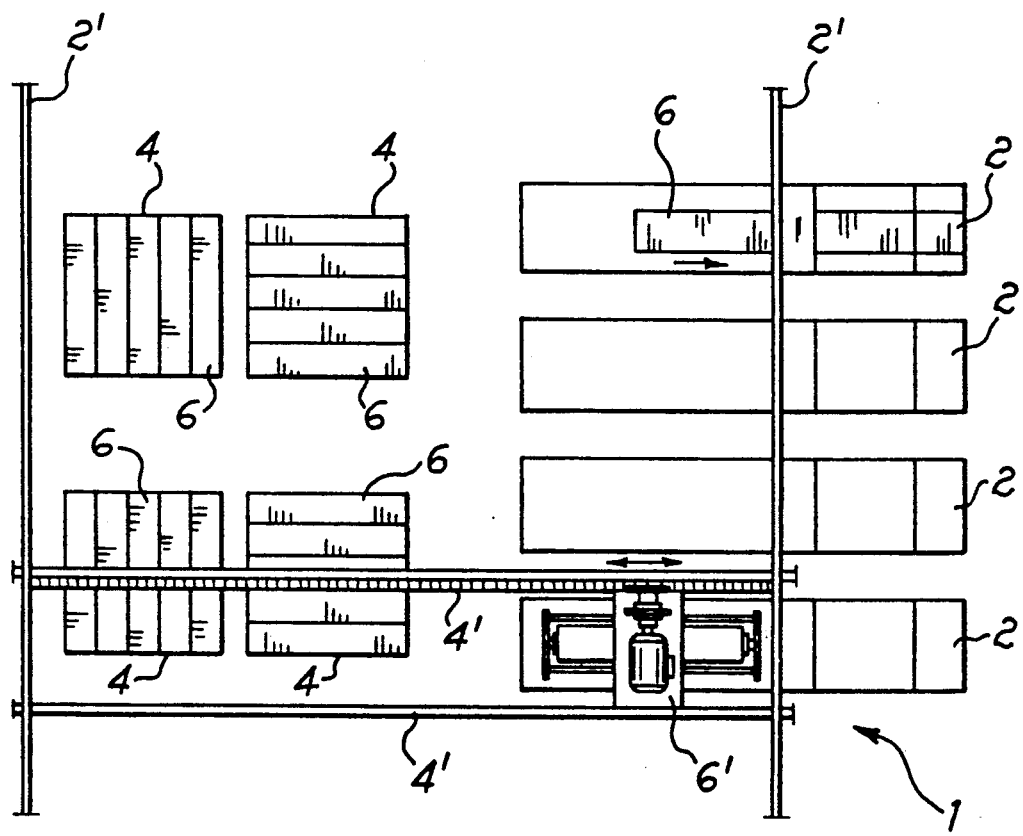
FIG. 1A shows schematically an equipment of the prior art adapted for transferring bundles of signatures as disclosed in the U.S. Pat. No. 4,750,132 of the same applicants.

More specifically, making references to FIG. 1A, the apparatus has been generally indicated by the reference 1. It comprises a frame under which are located an array of machines 2 and platforms 4 supporting signature bundles 6.

The frame substantially defines a bridge crane including a pair of parallel fixed guide rails 2' supported at a certain level above the floor, and a further pair of movable rails 4' extending substantially perpendicularly to the fixed rails 2' and able to translate substantially horizontally in the two opposite directions along the rails 2' driven by a motor which has not been shown. Carried on the movable rails 4' is a transfer head assembly 6' which is provided with a jaw assembly not shown. The jaw assembly with the transfer head assembly 6' is able to translate in both directions along the rails 4' between a signature bundle pick-up position, where the bundles 6 are piled on the platform 4, and the related machines 2, so that the individual bundles 6 are transferred from the platforms to the machines 2.

In FIG. 1-5 the same parts shown in FIG. 1A are depicted with the same reference numbers.

Referring now in particular to the reference numbers of the various Figures of the attached drawing, the subject equipment, for performing a coordinated transfer of packaged signature bundles from integrated cycle packaging facilities (1) to downstream machines, (2), comprises an array of conveyors, shown in general at (3), numbering the same as and in line with platforms (4)

of the above facility; an equal number of machines are provided downstream from said platforms and outside said frame.

More particularly, said machines are installed, downstream from said platforms, in such a way as to define, together with the area taken by facilities (1), a service lane or passage (5) along which the operators—in charge of inspection and maintenance—may freely move around, and into which passages conveyors (3) may move or be extended in order, to transfer individual signature bundles (6) from the platforms to downstream machines.

Said conveyors may be mounted on a stationary structure (7) as in the embodiment of FIGS. 2, 4 and 5 or else on a carriage (8), as in the embodiment of FIG. 3 suitably driven by its own motor and adapted to move along suitable tracks (9), provided in a transverse direction relative to the above passage.

In particular, referring now to FIG. 2, endless conveyor belt (10) may be mounted on a baseplate (11) adapted to slide longitudinally relative to the stationary support.

As an alternative (FIGS. 4 and 5), the endless conveyor belt is mounted on a stationary baseplate (12) and is able to extend all the way to the associated machine, through a reciprocation of one of the supporting pulleys (13), or else through a stretch thereof which is adapted to take a horizontal position as well as, by tilting, a vertical position.

In any case, a large enough room is provided between the conveyors, in their position close to facility (1), and the downstream machines, when the conveyors are at a standstill, to allow the personnel in charge of inspections to walk freely through.

Concerning the above it should be pointed out that the traversing motion of said conveyors is enabled under the automatic control of suitable sensors adapted to spot stationary or moving obstacles.

Said sensors are substantially adapted to stop said conveyor from moving in case they sense an operator being present within the range of action of the conveyor controlled thereby.

In particular, sensors may be substituted, including optical, electromechanical, electromagnetic, capacity type, induction type or pneumatic type. Or microswitch type, preferably the sensors are able to act directly on the power supply of the conveyor driving motor.

As an alternative, the motion of any part of the conveyor (baseplate or carriage or conveyor belt end) which might be involved, may be stopped, in case of a contact with an operator, by means of a suitable friction transmission.

Through the above features, the operators may move substantially unhindeded along lane (5), according to the particular actions they have to perform, in maximum safety conditions concerning both personal safety of the operators and proper operation of said conveyors.

From what has been described above and from observation of the Figures of the attached drawings, there appears the high degree of functionality and convenience in practical usage, which characterize the equipment, making the subject of this Invention Patent, adapted to perform coordinated transfer of packaged signature bundles from packaging facilities to the downstream machines.

It should be understood that the subject equipment has been described and shown herein for purely exemplary an non limiting purposes, for the only reason of proving the practical feasability and the general features of this Invention, whereby to the same there may be made all those variations and modifications which might be apparent to those skilled in this art, and which are within the scope of the above inventive concepts.

What we claim is:

1. An equipment adapted to perform a coordinated transfer of packaged signature bundles comprising:

platform positions on which bundles are piled;

a plurality of downstream machines;

a plurality of displaceable conveyors corresponding to the number of the machines and being installed in a space between said platform positions and said machines, and with a service passage normally provided around said machines, including a passage between each conveyor and a machine, which passage may be closed by displacement of the conveyor to feed a bundle from the conveyor to the machined and then reopended; and a bridge crane frame having at least one pair of substantially horizontal parallel fixed guide rails above and along the platform positions and enough of the conveyors, at least one pair of substantially horizontal parallel movable guide rails extending perpendicularly with respect to said fixed guide rails and slidably movable therealong, a transfer head assembly mounted on said movable guide rails for longitudinal displacement therealong having bundle pick-up means mounted on said transfer head assembly and vertically displaceable with respect thereto, in order to pick up said bundles from said platform positions, transfer and release said bundles on said conveyors, said machines and passage being outside of the movement of said transfer head assembly.

2. The equipment of claim 1, wherein each displaceable conveyor is formed by a fixed base and a horizontally displaceable conveyor belt above the base, said base being located between the corresponding platform and machine and the displaceable belt being movable closing the passage for feeding a bundle to the machine.

* * * * *